US 6,628,285 B1

(12) United States Patent
Abeyta et al.

(10) Patent No.: US 6,628,285 B1
(45) Date of Patent: Sep. 30, 2003

(54) INTELLIGENT DRAWING REDLINING AND COMMENTING FEATURE

(75) Inventors: Vincent J. Abeyta, Oakland, CA (US); Damian M. Hallbauer, San Francisco, CA (US); Laurence D. Horner, San Francisco, CA (US); Joshua A. Natarajan, Lafayette, CA (US); Benjamin D. Sellers, San Francisco, CA (US)

(73) Assignee: Autodesk, Inc., San Rafael, CA (US)

( * ) Notice: Subject to any disclaimer, the term of this patent is extended or adjusted under 35 U.S.C. 154(b) by 0 days.

(21) Appl. No.: 09/501,474

(22) Filed: Feb. 9, 2000

Related U.S. Application Data
(60) Provisional application No. 60/119,695, filed on Feb. 11, 1999.

(51) Int. Cl.[7] ................................................ G06T 11/20
(52) U.S. Cl. ........................ 345/441; 345/442; 345/622; 715/512
(58) Field of Search ................................. 345/441, 442, 345/622; 707/526; 715/512

(56) References Cited

U.S. PATENT DOCUMENTS

| | | | |
|---|---|---|---|
| 5,444,836 A | 8/1995 | Hollingsworth et al. | |
| 5,490,241 A | 2/1996 | Mallgren et al. | |
| 5,513,309 A | 4/1996 | Meier et al. | |
| 5,564,004 A | 10/1996 | Grossman et al. | |
| 5,594,855 A | * 1/1997 | Von Ehr, II et al. | ........ 345/442 |
| 5,627,949 A | 5/1997 | Letcher, Jr. | |
| 5,633,955 A | 5/1997 | Bozinovic et al. | |
| 5,704,028 A | 12/1997 | Shanel et al. | |
| 5,760,774 A | 6/1998 | Grossman et al. | |
| 5,818,457 A | 10/1998 | Murata et al. | |
| 5,856,828 A | 1/1999 | Letcher, Jr. | |
| 5,894,310 A | 4/1999 | Arsenault et al. | |
| 5,900,874 A | 5/1999 | Shrader et al. | |
| 6,360,236 B1 | * 3/2002 | Khan et al. | .................. 707/526 |

OTHER PUBLICATIONS

Mark Edel, "The Tinkertoy Graphical Programming Environment", IEEE, p. 1110 to 1115 ©1988.
Townsend et al. QUE, "Microsoft Office 6–in–1 New Edition", p. 713 ©1994.
Wild Tools, Cloud Tool, 3 pgs.
Autodesk, Viewer for AutoCAD Design Data–13 Volo View, 2 pgs. ©1999.
DWG Viewer—Volo View—Free DWG File Viewer, 6 pgs. ©1999.

(List continued on next page.)

*Primary Examiner*—Michael Razavi
*Assistant Examiner*—Faranak Fouladi
(74) *Attorney, Agent, or Firm*—Gates & Cooper LLP

(57) ABSTRACT

A method, apparatus, and system provides an integrated viewer with one user interface and one API provides the ability to view, program, redline, and measure DWF and DWG files. In accordance with one or more such embodiments, the present invention provides an intelligent drawing redlining tool for easily and quickly drawing or annotating a drawing. For example, using the tool, a user can click the mouse over the first point of an arc segment. A bulge spacing function may then be utilized to define the length of an arc (also referred to as bulge spacing). In accordance with one or more embodiments of the invention, the bulge spacing function comprises holding down an arc defining key such as the <SHIFT>key while the second point of the arc segment is selected. Thereafter, the bulge spacing of the first arc segment (the distance of the arc between the first and second points) is utilized for the remaining arc segments of the enclosed polyline/path. Thereafter, the user merely moves the mouse around the drawing and embodiments of the invention automatically draw arcs with the defined bulge spacing. To enclose the shape (also referred to as closing the polyline), the user moves the cursor on top of the beginning or first point of the first arc segment wherein embodiments of the invention automatically close and complete the shape. Consequently, a closed path that is not symmetrical can be drawn around odd shaped objects quickly and easily.

26 Claims, 12 Drawing Sheets

OTHER PUBLICATIONS

Autodesk—The Volo Product Family—Volo View—Volo View User's Guide, 1 pg. ©1999.
Autodesk—Volo View Express Readme, 14 pgs.
Autodesk—Volo—Installing Volo View, 4 pgs. ©1999.
Autodesk—Volo—Viewing Files with Volo View, 14 pgs. ©1999.
Autodek—Volo—Generating DWF Files, 1 pg. ©1999.
Autodesk—Volo—Publishing Drawings, 11 pgs. ©1999.
Autodesk—Volo—Maintaining Volo View Locally, 1 pg. ©1999.
Autodesk—The Volo Product Family—Volo View—Developer Zone, 1 ©1999.
Autodesk—Volo—Working with the Volo View API, 2 pgs. ©1999.
Autodesk—The Volo Product Family—Volo View, 3 pgs. ©1999.
Autodesk, WHIP! Home Page—The Free DWF Viewer, 1 pg. ©1999.
Autodesk—WHIP!—The Free Viewer for DWF Drawings—Product Overview, 2 pgs. ©1999.
Autodesk—WHIP!—Images in DWF Drawings, 3 pgs. ©1999.
Autodesk—WHIP!—WHIP! and DWF: A Primer, 4 pgs. ©1999.
Autodesk—WHIP!—The Free Viewer for DWF Drawings—Using WHIP! 2 pgs. ©1999.
Autodesk—WHIP! Readme, 13 pgs. ©1999.
Autodesk—Installing WHIP! 8 pgs. ©1999.
Autodesk—Viewing DWFs with WHIP! 6 pgs. ©1999.
Autodesk—Generating DWFs, 13 pgs. ©1999.
Autodesk—Publishing DWFs, 10 pgs. ©1999.
Autodesk—Maintaining WHIP! Locally, 6 pgs. ©1999.
Autodesk—WHIP!—The Developer Zone, 2 pgs. ©1999.
Autodesk—Using VB, JS, and C++ with WHIP!, 6 pgs. ©1999.
Autodesk—WHIP! API Documentation, 2 pgs. ©1999.
Autodesk—Autodesk View 2.0, 2 pgs. ©1999.
Autodesk—View—Product Features, 3 pgs. ©1999.
Autodesk—View—What's New, 1 pg. ©1999.
Autodesk—View—Questions and Answers, 9 pgs. ©1999.
Autodesk—View—Product Features, 1 pg. ©1999.
Autodesk—View—Autodesk View 2.0 AutoCAD Integration Tool Download, 3 pgs. ©1999.
Autodesk—Autodesk View DwgX, 2 pgs. ©1999.
Autodesk—Autodesk View DwgX Features, 3 pgs. ©1999.
Autodesk—Autodesk View DwgX and WHIP! 2 pgs. ©1999.
Autodesk—Autodesk View DwgX—Developer Resources, 3 pgs. ©1999.
Autodesk—Autodesk View DwgX API Test, 19 pgs.

* cited by examiner

INTELLIGENT DRAWING REDLINING AND COMMENTING FEATURE

CROSS-REFERENCE TO RELATED APPLICATIONS

This application claims the benefit under 35 U.S.C. §119(e) of co-pending and commonly assigned U.S. Provisional application serial No. 60/119,695, entitled "INTELLIGENT DRAWING REDLINING AND COMMENTING FEATURE," filed on Feb. 11, 1999, by Vincent Joseph Abeyta et. al., which application is fully incorporated by reference herein.

This application is related to the following co-pending and commonly-assigned patent applications, all of which applications are incorporated by-reference herein:

U.S. patent application Ser. No. 09/488,308, entitled "SHAPE OBJECTS HAVING AUTHORABLE BEHAVIORS AND APPEARANCES", by Lawrence Felser, et. al., filed on Jan. 20, 2000, now U.S. Pat. No. 6,219,056, issued on Apr. 17, 2001;

U.S. patent application Ser. No. 09/088,116, entitled "POSITIONING AND ALIGNMENT AIDS FOR SHAPE OBJECTS WITH AUTHORABLE BEHAVIORS AND APPEARANCES", by Lawrence Felser, et. al., filed on Jun. 1, 1998, now U.S. Pat. No. 6,232,983, issued on May 15, 2001; and U.S. patent application Ser. No. 09/450,207, entitled "FRAMEWORK FOR OBJECTS HAVING AUTHORABLE BEHAVIORS AND APPEARANCES", by Lawrence Felser, et. al., filed on Nov. 29, 1999, now U.S. Pat. No. 6,462,751, issued on Oct. 8, 2002.

BACKGROUND OF THE INVENTION

1. Field of the Invention

The present invention relates generally to computer-implemented graphics systems, and in particular, to a method, apparatus, and article of manufacture for an intelligent drawing redlining and commenting feature in a computer-implemented graphics system.

2. Description of the Related Art

Computer-implemented graphics systems (such as AutoCAD®) have been widely used by designers, illustrators, drafters, and engineers for a number of years. In such graphics systems, users often create, move, manipulate, and place objects (e.g., lines, shapes, points, etc.) on a drawing, plan, sketch, etc. For example, a user may create and place a square, circle or other shape on a drawing.

In the prior art, multiple user actions are required to complete drawing an object or shape. For example, to draw a polygon; the user may have to click the mouse for each vertex of the polygon. To complete the polygon, the user double clicks the mouse button.

The prior art discloses some redlining and commenting tools including tools for drawing multiple arc segments that form a closed path. Such tools provide the appearance to the viewer of a cloud. However, the prior art tools force the user to either click the mouse for each vertex (for each arc), or are symmetrical such that the arc segments cannot enclose odd shaped objects.

Consequently, there is a need in the art for a simple and easy mechanism for drawing multiple connected arc segments that form a closed path/enclosed shape. To more fully understand the invention, a description of prior art drawing programs is useful.

In some graphics programs such as AutoCAD®, files are stored as drawings DPWG) files. Another format is the Drawing Web Format (DWF) which is an open format for storing and transmitting AutoCAD® drawings on the world-wide web.

Instead of requiring the full version of AutoCAD® to view DWG or DWF drawings, one or more viewers may be utilized to view the drawings. For example, WHIP™ is a viewer for DWF files ("DWF files") that is available as an ActiveX Control for the Microsoft Internet Explorer and as a Plug-in for Netscape Navigator. The WHIP™ program can be downloaded from the internet. Further, WHIP™ allows DWF files to be viewed via a browser as part of HTML pages and has a rich Application Program Interface (API) that allows DWF files to be manipulated via Java, JavaScript, or Visual Basic.

Another viewing program is AutoDesk View®. AutoDesk Viewe is a commercial viewer for native AutoCAD® DWG files. In addition to viewing, Autodesk View® allows drawings to be marked up (reviewed and marked up) and measured. Autodesk View® users can download a free DwgX ActiveX Control that allows them to have Autodesk View® capabilities from within the Microsoft Internet Explorer browser. Some versions of Autodesk View® can read DWF files in addition to DWG and DXF files.

AutoDesk View® and WHIP™ provide different user interfaces for displaying the information. Thus, it is desirable to have one integrated viewer that can view, program, redline, and measure both DWG and DWF file formats, and that uses the same user interface and API. As part of such an integrated viewer, it is desirable to have tools (such as a cloud tool) for editing and marking up the drawing.

Prior art mechanisms attempted to provide users with the ability to markup drawings and design information. However, markup has not been a central facet of use for many users because of the many deficiencies In the prior art.

SUMMARY OF THE INVENTION

A method, apparatus, and system provides an integrated viewer with one user interface and one API provides the ability to view, program, redline, and measure DWF and DWG files. In accordance with one or more such embodiments, the present invention provides an intelligent drawing redlining tool for easily and quickly drawing or annotating a drawing. For example, using the tool, a user can click the mouse over the first point of an arc segment. A bulge spacing function may then be utilized to define the length of an arc (also referred to as bulge spacing). In accordance with one or more embodiments of the invention, the bulge spacing function comprises holding down an arc defining key such as the <SHIFT>key while the second point of the arc segment is selected. Thereafter, the bulge spacing of the first arc segment (the distance of the arc between the first and second points) is utilized for the remaining arc segments of the enclosed polyline/path. Thereafter, the user merely moves the mouse around the drawing and embodiments of the invention automatically draw arcs with the defined bulge spacing. To enclose the shape (also referred to as closing the polyline), the user moves the cursor on top of the beginning or first point of the first arc segment wherein embodiments of the invention automatically close and complete the shape. Consequently, a closed path that is not symmetrical can be drawn around odd shaped objects quickly and easily.

BRIEF DESCRIPTION OF THE DRAWINGS

Referring now to the drawings in which like reference numbers represent corresponding parts throughout.

DETAILED DESCRIPTION OF THE INVENTION

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

The present invention is a computer-implemented graphics system that provides for an integrated viewer with one user interface and one API that provides the ability to view, program, redline, and measure DWF and DWG files. In accordance with embodiments of the invention, a cloud tool provides the user with the ability to easily and quickly create a cloud to markup an existing drawing or as a shape on a new or existing drawing.

Hardware and Software Environment

Figure 1:
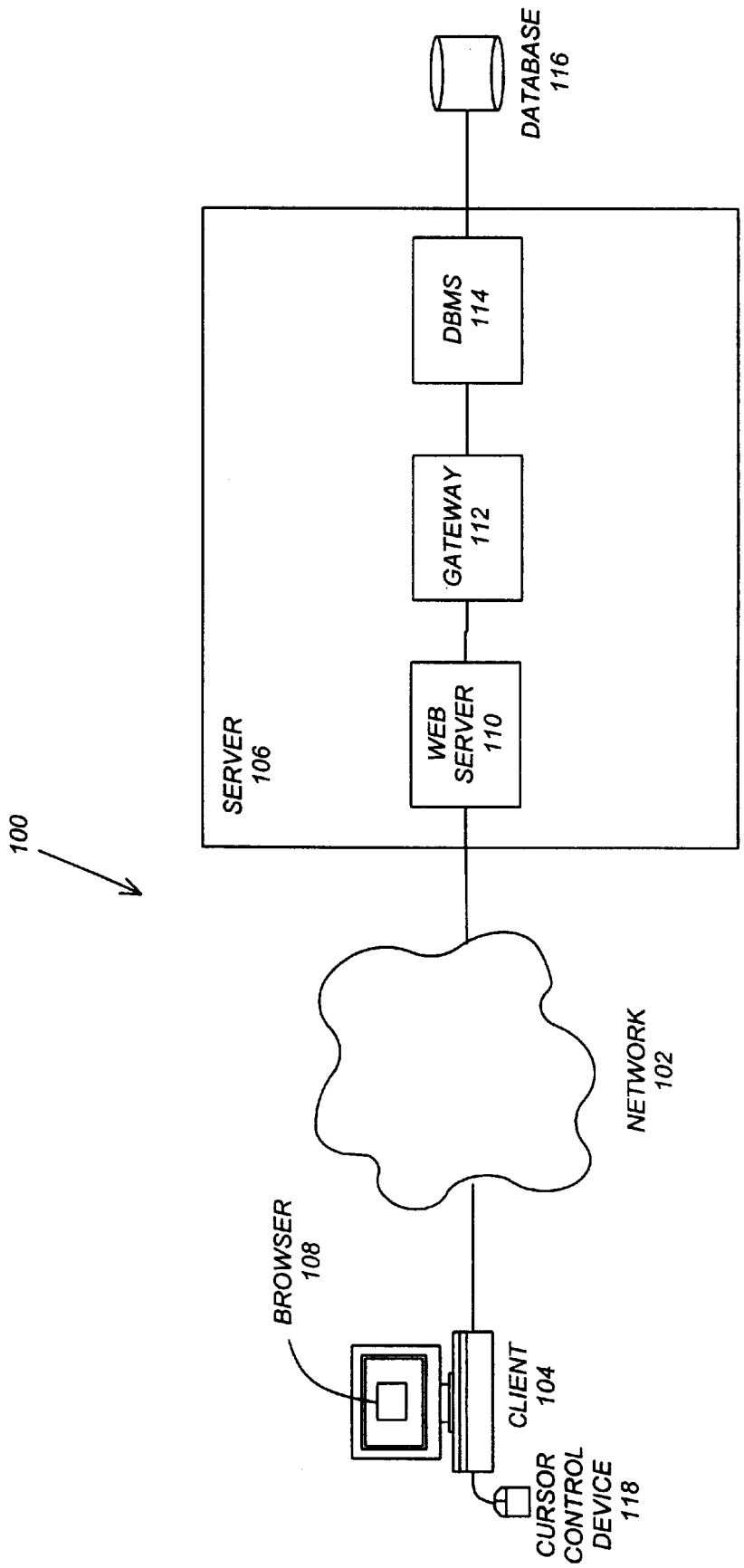
FIG. 1 schematically illustrates a hardware and software environment in accordance with one or more embodiments of the invention.

FIG. 1 schematically illustrates a hardware and software environment in accordance with one or more embodiments of the invention, and more particularly, illustrates a typical distributed computer system 100 using a network 102 to connect client computers 104 to server computers 106. A typical combination of resources may include a network 102 comprising the Internet, LANs, WANs, SNA networks, or the like, clients 104 that are personal computers or work stations, and servers 106 that are personal computers, work stations, minicomputers, or mainframes. Additionally, both client 104 and server 106 may receive input (e.g., cursor location input) and display a cursor in response to an input device such as cursor control device 118.

In accordance with one or more embodiments of the invention, the Internet 102 connects client computers 104 executing Web browsers 108 to server computers 106 executing Web servers 110. The Web browser 108 is typically a program such as Netscape's Navigator or Microsoft's Internet Explorer. Further, as described below, the software may be downloaded from server computer 106 to client computer 104 and installed as a plug in or ActiveX control of Web browser 108. The Web server 110 is typically a program such as IBM's Hypertext Transport Protocol (HTTP) Server or Microsoft's Internet Information Server. In one or more embodiments of the invention, the servers 106 also execute a Common Gateway Interface (CGI) 112, which interfaces between the Web server 110 and a database management system (DBMS) 114. DBMS 114in turn may interact and control information stored in database 116. In accordance with one or more embodiments of the invention, database 116 contains DWG, DXF, or DWF files. Additionally, in accordance with one or more embodiments of the invention, database 116 maybe part of or connected directly to client 104 instead of communicating/obtaining the information from database 116 across network 102.

Generally, these components 108, 110, 112, and 114 all comprise logic and/or data that is embodied in or retrievable from device, medium, signal, or carrier, e.g., a data storage device, a data communications device, a remote computer or device coupled to the computer via across a network or via another data communications device, etc. Moreover, this logic and/or data, when read, executed, and/or interpreted, results in the steps necessary to implement and/or use the present invention being performed.

Thus, embodiments of the invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass logic and/or data accessible from any computer-readable device, carrier, or media.

Those skilled in the art will recognize many modifications may be made to this exemplary environment without departing from the scope of the present invention. For example, those skilled in the art will recognize that any combination of the above components, or any number of different components, including different logic, data, different peripherals, and different devices, may be used to implement the present invention, so long as similar functions are performed thereby. Specifically, those skilled in the art will recognize that the present invention may be applied to any database, associated database management system, or peripheral device.

Operation of the Graphics Program

In one or more embodiments of the invention, an integrated viewer with one user interface and one API provides the ability to view, program, redline, and measure DWF and DWG files. The integrated viewer may be downloaded from a server 106 across a network 102 such as the internet and may augment a browser 108 with a plug-in or ActiveX control for viewing DWF and DWG files through the browser 108. In accordance with embodiments of the invention, various versions may be offered. For example, a mild/express version may create a 2D and 3D pipeline, read DWG/DXF files, read DWF files, provide drag and drop functionality, provide clipboard copying functionality, provide for system printing, and provide for viewing of embedded OLE objects. In another version, in addition to the above functionality, the version may provide markup capability, measuring capability, plot to scale capability, and may be a plug-in or ActiveX control for a browser 108. Either version may provide tools to the user for editing and marking up the drawing. For example, in accordance with one or more embodiments (as described in detail below), a closed polyline tool may be provided. The user may elect to load any associated markups found in the drawing path (or the application path) when a drawing is loaded. Further, to allow protection of the files for editing, embodiments of the invention may require a user identification process (e.g., a login procedure) before editing of the object will be allowed.

In accordance with one or more embodiments of the invention, users may markup a drawing, plan, sketch, etc. Markup encompasses many features and functions that facilitate the inclusion of comments with drawing and design information. Prior art markup products allow users to draw clouds, text, and arrows which indicate changes that need to be made, requests for clarification or more information, and design suggestions and comments made by people other than the designer. However, as described above, prior art markup mechanisms are not extensively used. One or more embodiments of the invention provide a basic level of markup support with an infrastructure that will allow more complex, more intelligent markups to be developed in the future. When opening a redline with a drawing, one or more embodiments of the invention allow the user to select the drawing version to open the redlines with. For example, a user may select the current version of a drawing file (which may be set as a default within the system) or a user can select an archived version of a drawing file with which to view a redline file.

The benefits of markup accrue to those who streanline their design process to take advantage of electronic viewing and reviewing. Design teams that use markup generate less paper, and therefore have fewer paper documents to keep track of. Further, electronic markup creates a "paper trail," a history of who said what and when, so that decisions and changes can be more easily reviewed. Additionally, electronic markup combined with networking allows more people to simultaneously provide feedback on drawings.

In addition to the above, markup capability may provide one or more of the following benefits to users: the ability for multiple reviewers to integrate their comments in one file and for those comments to be easily distinguished by color (a different markup color may be utilized by each user and embodiments of the invention will display markups in different colors even if a user's markup color conflicts with another user's markup color); object-based markups that maintain information about who created them and when; a familiar (recognizable user interface) way of working with and manipulating markup objects; the ability to open multiple markup files simultaneously, and better integration of markups with DWG files and with AutoCAD.

In accordance with one or more embodiments of the invention, markups can be created using markup tools (e.g., rectangle, text, callout, line, cloud, note, stamp, link, sketch, circle, etc.) and a menu and/or toolbar. Further, multiple markups maybe simultaneously viewed by a user (on an internet browser or other application) and markups may be more visible by turning off the color in a drawing (e.g., viewing the drawing in grayscale). For example, the current view of the drawing may be displayed in black and white, while markups retain their own color settings (such as red or yellow). Additionally, users may configure the markup options including layer, layer color, highlight, arrow scale, text size, save path, file extension, and autoloading features. In accordance with one or more embodiments of the invention, markup information may be stored in the DWG format in a separate file and combined markups can be collected and placed on top of each other (or stored separately) depending on the user's desires. Further, at print time, users may have the ability to include markup objects in the printed output.

Commands for creating and manipulating geometry may be contained in two menus: draw and modify. The draw menu provides commands for creating geometry. The modify menu deals with organizing or positioning geometric objects within the environment that contains them (e.g., rotate, group, etc.) and modifying the shape of geometry. To begin drawing geometry, a user clicks on one of the draw toolbar buttons or commands in the draw menu. Drawing tools that require only two clicks (line, rectangle, circle, arc, etc.) can use either two distinct clicks or a single click-drag-release gesture. The new geometry rubber-bands to follow the cursor in either case.

A user can set whether drawing tools create a single object and then return the user to the arrow cursor (navigation mode), or stay active to create multiple objects until the user clicks <ESC>or the arrow tool (referred to as "sticky" mode). Thus, each tool may operate in two modes, a regular mode and a "sticky" mode. As described above, while in regular mode, a user returns to navigation mode after each individual markup object is drawn. While in sticky mode, the user stays in the markup tool until a different tool or mode is chosen. To set the mode to be utilized for a tool, an options dialog screen may be utilized. Alternatively, "sticky" mode may be utilized when a user double-clicks on a toolbar button. In accordance with one or more embodiments of the invention, when a tool is running, clicking on an arrow toolbar button ends the tool. Consequently, any geometry that has already been created will continue to exist (e.g., already created segments of a polyline or spline). Additionally, clicking on the tool's own toolbar button will pop out the button and cause the arrow tool to run. The result is the same as clicking the arrow toolbar button.

In accordance with one or more embodiments of the invention, if the user is in the middle of actively defining geometry (i.e., dragging the endpoint of a line or radius of a circle), hitting an escape key such as <SC>will cause the new geometry to be deleted. In the case of polylines and splines, the segment currently being created will be deleted, but previously defined segments will remain. The tool reverts to the selector (i.e., the arrow tool) if the user is in regular mode, or reverts to the neutral state for the running tool, if the user is in "sticky" or repeat mode. If the tool is already in the neutral state, hitting the <ESC>key will end the tool and revert to the selector (i.e., the arrow tool).

In accordance with one or more embodiments of the invention, the <SHIFT>key constrains the currently selected tool. However, in one or more embodiments of the invention, other keys may be utilized to constrain the currently selected tool (e.g., the <CTRL>key, the <ALT>key, etc.). For example, rectangles maybe constrained to squares, ellipses may be constrained to circles, and lines, polylines, and arcs may snap to the snap angle increment (set in a snap dialog). Thus, when modifying rectangles and ellipses by dragging their handles while holding down the <SHIFT>key, the shapes are constrained to a fixed aspect ratio.

In accordance with one or more embodiments of the invention, a status bar informs and prompts the user regarding the next step. For example, when using the line tool, the status bar may display "Click line start point," then "Cick line endpoint.". Additionally, the status bar may read out the coordinates of the cursor in the model space base drawings and in the units for the base drawing. Further, in one or more embodiments of the invention, markup properties including the author, date of creation, time of creation, source drawing (drawing the user was viewing when the markup object was created (including GUID information for the source drawing)), and markup status (the set of fields that provides further information about a project such as the status of the markups of the objects; the set of fields may include open, closed, pending, deferred, for review, integrated, completed, rejected, or other user-definable setting) may apply to all redline geometry and markups. To view the markup properties, the user can right-click on a markup object and choose "properties."

Figure 2:
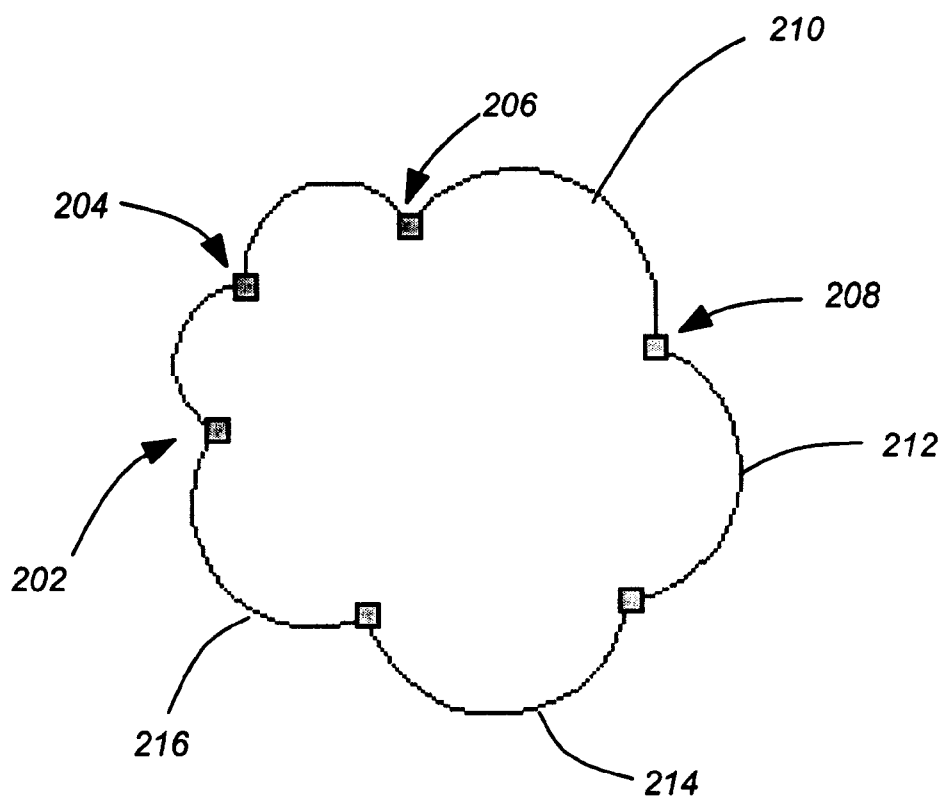
FIG. 2 illustrates a closed polyline drawn with an intelligent drawing tool of the invention.

In accordance with one or more embodiments of the invention, a markup tool (also referred to as a cloud tool) provides the ability to easily draw multiple connected arc segments that enclose an area on a drawing (e.g., a cloud). The cloud tool may be utilized to markup an existing drawing or draw a shape on a new drawing. FIG. 2 illustrates an enclosed area comprised of multiple connected arc segments drawn with a cloud tool of the invention. The cloud tool allows the user to create multiple arc segments (e.g., a cloud) around a region of the drawing (this is typically done to help call attention to other comments). Clouds are created when the user selects the cloud tool, then clicks to express a closed polyline shape around a region. Rubberband feedback will show the user the current shape of the cloud. Clouds will always be drawn so that the arcs 210–216 face inward, whether the polyline is drawn clockwise or counterclockwise. Thus, the cloud tool creates a closed Path object with bulged (arc) segments 210–216. Each mouse click creates additional arcs/arc segments 210–216 within the closed object. When the user reaches the starting point 202, the cloud will be automatically closed by joining the first arc segment and the last arc segment at conjoining endpoints. If the user presses backspace during the drawing of the points, the last point selected will be deselected.

The size of the arcs 210–216 that make up the cloud line are set each time the user clicks while drawing the cloud. In one or more embodiments, the open angle of the arcs is 150°. In one or more embodiments of the invention, bulge spacing function is utilized to define the distance between arcs (i.e., the bulge spacing). In one or more such embodiments, the bulge spacing function is comprised of holding down an arc defining key (any key that has been associated with the described task such as the <SHIFT>key) and clicking a point. Thereafter, the current distance between arcs (i.e., the bulge spacing) will be set in a running mode, and for the remainder of the arc segments, the user will only need to move the mouse to continue drawing each arc segment. Thus, the user can stop clicking, release the arc defining key, and complete multiple arc segments (and enclose an area with the multiple arc segments) merely by moving the mouse. For example, in FIG. 2, the user may start at point 202, click once at point 204, click again at point 206, and then hold the <SHIFT>key while clicking point 208. By holding down the <SHIFT>key, the user establishes the bulge spacing (i.e., the length of arc 210) for the remaining arc segments 212–216. Thus, the user releases the <SHIFT>key and the mouse button and merely moves the mouse around. The cloud tool automatically inserts arcs 212–216 with the same bulge spacing as arc 210 until the user moves the mouse over the starting point 202 at which time the tool automatically closes and completes the shape. In accordance with one or more embodiments of the invention, a shape produced using the cloud tool may include one or more of the following properties: object, layer, point0 x, point0 y, fillet radius, point1 x, point1 y, fillet radius, etc., and a lockedclosed (property that prevents a closed path from being opened; the path's start and endpoints must be coincident for locking to occur).

The path of the cloud consists of two or more pieces of geometry (e.g., two or more arc segments) that are treated as a single object. The individual pieces of geometry in the cloud path are called segments. Segments with coincident endpoints share a common endpoint (e.g., arc 210 and arc 212 share the common endpoint 208). If a path is closed, it can be filled, based on its fill properties, which can be edited in a formatting toolbar or a fill tab of a property window. Thus, since a cloud is a closed path, the cloud can be filled. A filled path can also have holes. To create a path with holes, a user joins together geometry that forms multiple closed outlines, with the holes enclosed by an outer boundary.

A user can use a "join" command to create a path or to add additional geometry to a path. Geometry will be joined at coincident vertices. Only two pieces of geometry can share a single vertex. If more than two are coincident, only two will share the vertex. A user can create a path from a single piece of geometry. This allows the user to select an existing path that appears closed but does not have a merged start and end vertex, and merge these vertices.

An "explode" command maybe utilized to turn a path back into individual pieces of geometry. If a path contains multiple closed outlines, "explode" will result in multiple independent paths. These paths will be selected following the "explode" command. If the user clicks "explode" again, the paths are reduced to individual pieces of geometry.

A user can select and edit the individual pieces of geometry that make up a path without destroying the path. For example, the user may click once to select the path. The user may click again to select an individual segment. The rest of the path's handles disappear and the normal geometry handles for the selected segment are displayed. The segment handles can be dragged or modified. In any case, the segment will remain joined to its neighbors in the path. A user can also delete a segment, which will create a sub-path.

A vertex can be added to a path using an "add vertex" tool. The user merely clicks on the path where the user desires to place the new vertex.

A user can use a "split" command to unhook coincident segment endpoints that form a vertex in a path. The user merely clicks the vertex handle, which will become highlighted, then clicks "split." The endpoints then have two independent handles (but still in the same place until one of them is moved).

To add a completely new segment to a path, the "split" command is used to unhook the two segments and the user drags the two endpoints apart from each other using their handles. Thereafter, the user merely snaps the new geometry to the endpoints of the two segments, selects the new geometry and the path, and clicks "join".

Figure 3:
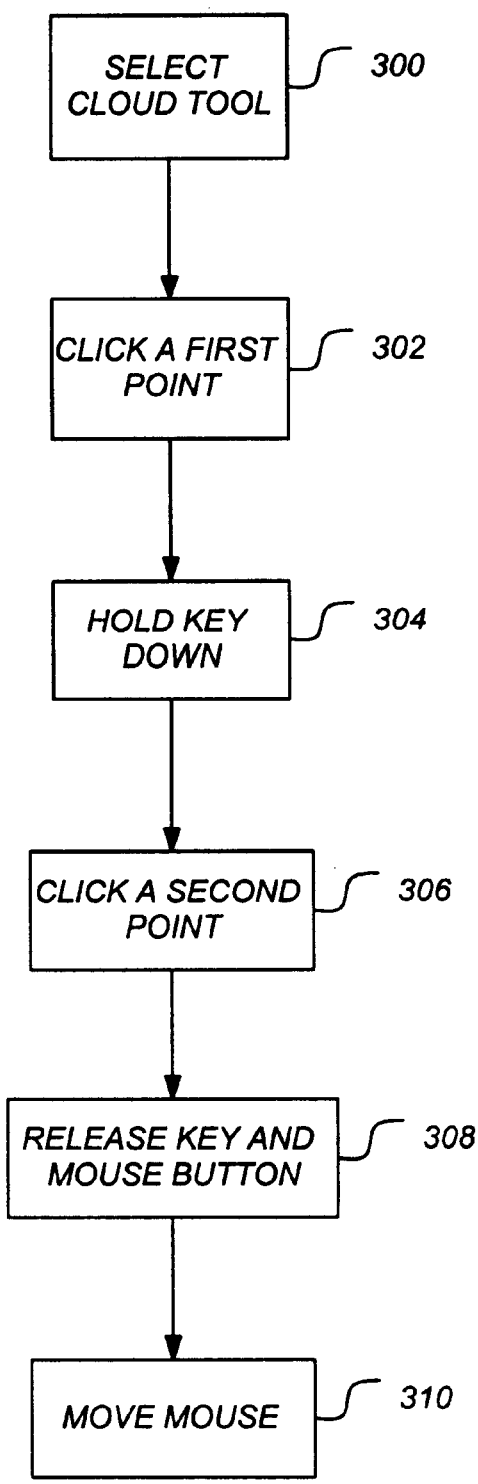
FIG. 3 is a flow chart illustrating the creation of a closed polyline in accordance with one or more embodiments of the invention.

FIG. 3 is a flow chart illustrating the creation of an enclosed shape in accordance with one or more embodiments of the invention. At step 300, the user selects the cloud tool. Step 300 may be accomplished by clicking on an icon in a toolbar or selecting the cloud tool option from a menu. Step 302 is the first step in the bulge spacing function (i.e., the function that defines the bulge spacing for all arcs in a cloud). Consequently, prior to step 302, a user may create multiple arcs or bulges as part of the shape. Once a determination is made to define the bulge spacing, the user clicks a first point at step 302. At step 304, the user holds down an arc defining key (e.g., the <SHIFT>key). At step 306, the user clicks a second point. As described above, steps 302–306 comprises the bulge spacing function and will set the bulge spacing for the remainder of the shape. At step 308, the user releases the depressed key and the mouse button. At step 310, the user merely moves the mouse to create additional arc segments. To close the shape (e.g., complete the cloud), the user moves the mouse to the starting point.

In accordance with one or more embodiments of the invention, in addition to the cloud tool the following tools may be utilized:

Select Tool

The select tool allows the user to select markup objects by clicking on them. While in select mode, each time the user clicks on a markup object, that object becomes selected, and all other markup objects are unselected. The user can select multiple markup objects by holding the CIRL key while selecting, or by drawing a box around the objects the user wishes to select. In one or more embodiments, objects that are selected will be highlighted in a color other than the color of the markup object.

Line Tool

Figure 4:
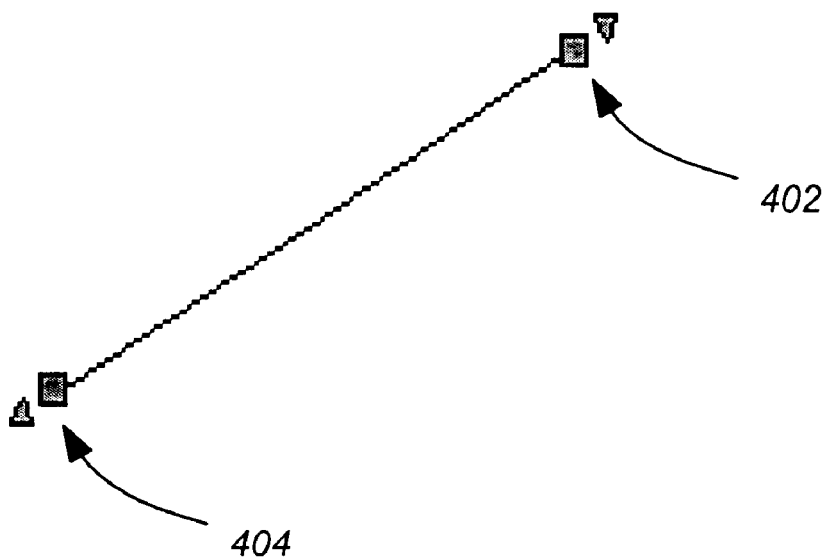
FIG. 4 illustrates a line drawn in accordance with a line tool of the invention.

FIG. 4 illustrates a line drawn in accordance with a line tool of the invention. The line tool draws a line between two points 402 and 404 that the user clicks on the screen. Holding the <SHIFT >key constrains the line to the eight ordinal directions. Thus, to draw a two point line, the user clicks the line start point 402, and then clicks or drags the mouse to define the line endpoint 404. When the user drags the length handles 402 or 404, the end of the line 402 and 404 and the handle 402 or 404 maintain the same relative position until a snap occurs, at which point the endpoint and the handle will become coincident. In accordance with embodiments of the invention, the properties of a line may include object, layer, start x, start y, length, angle, delta x, delta y, end x, and end y.

Circle Tool

Figure 5:
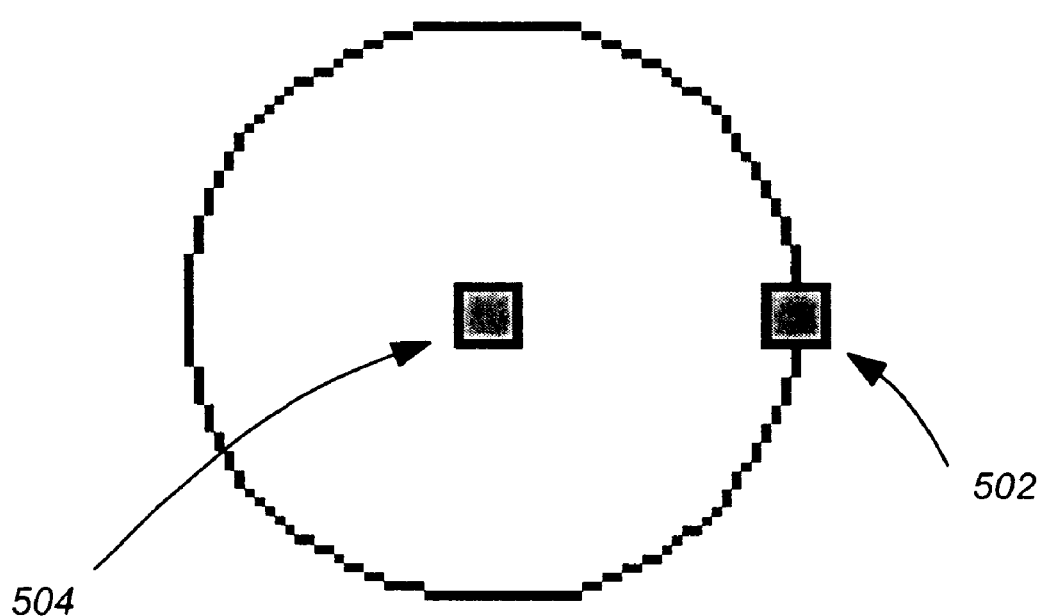
FIG. 5 illustrates a circle drawn with a circle tool of the invention.

FIG. 5 illustrates a circle drawn with a circle tool of the invention. The circle tool allows the user to draw a circle by first clicking on the center of the circle 504, then clicking or dragging the mouse to 502 to describe/define the radius of the circle. In accordance with one or more embodiments of the invention, the properties of a circle may include object, layer, center x, center y, and radius.

Ellipse Tool

Figure 6:
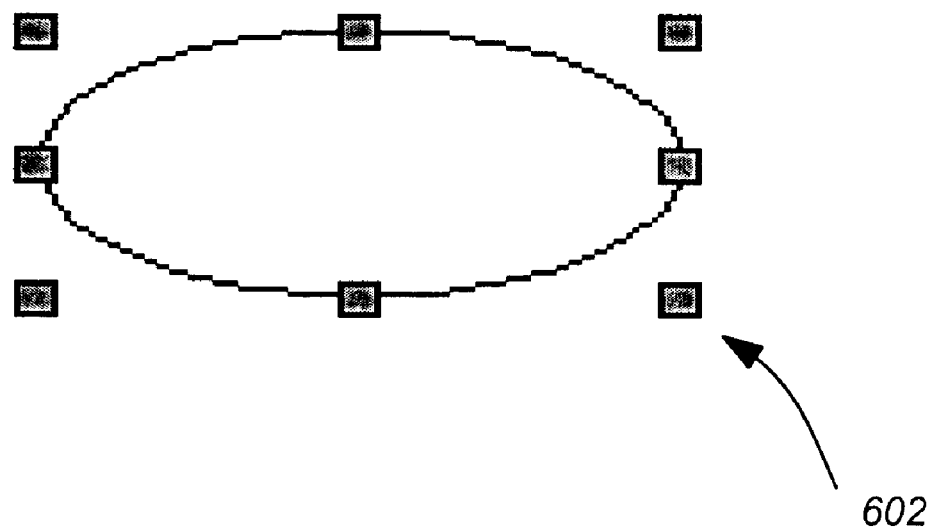
FIG. 6 illustrates an ellipse drawn using an ellipse tool of the invention.

FIG. 6 illustrates an ellipse drawn using an ellipse tool of the invention. The ellipse tools allows the user to draw an ellipse by first clicking on a corner 602 of a box around the ellipse and then clicking or dragging the mouse to define the height and width of the ellipse. In accordance with one or more embodiments of the invention, the properties of an ellipse may include object, layer, center x, center y, major radius, minor radius, and angle.

Arc Tool

Figure 7:
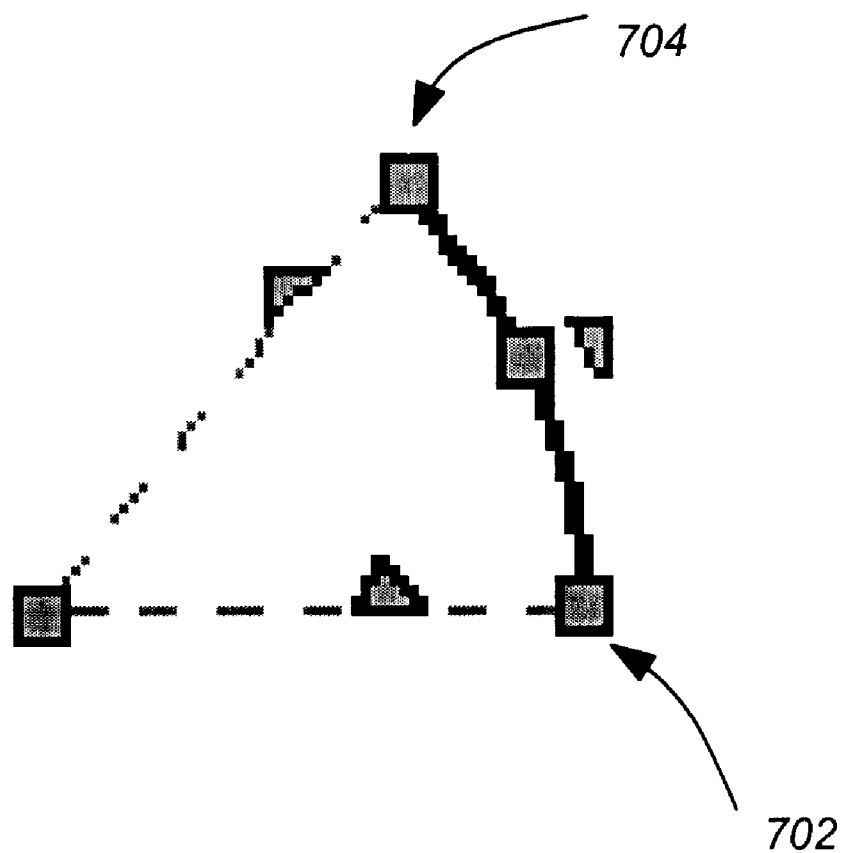
FIG. 7 illustrates an arc drawn using an arc tool of the invention.

FIG. 7 illustrates an arc drawn using an arc tool of the invention. The arc tool allows the user to draw an arc by clicking the arc starting point 702 and then clicking or dragging the mouse to define the arc end point 704. In accordance with one or more embodiments of the invention, the properties of an arc may include object, layer, center x, center y, radius, start angle, end angle, start x, start y, end x, end y, third x, and third y.

Rectangle Tool

Figure 8:
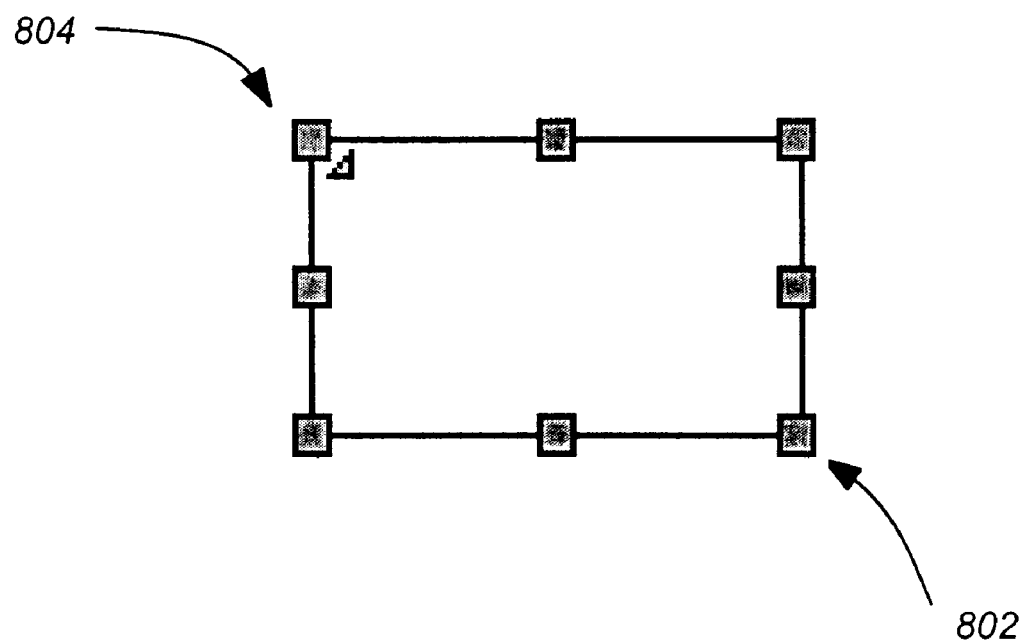
FIG. 8 illustrates a rectangle drawn using a rectangle tool of the invention.

FIG. 8 illustrates a rectangle drawn using a rectangle tool of the invention. The rectangle tool allows the user to draw a box over a region of the drawing. The user specifies the size of the block by clicking and dragging the mouse cursor from one corner 802 to the other corner 804 to define the rectangle's height and width. If the user hold the shift key while dragging the cursor, the rectangle will be constrained to a square. In accordance with one or more embodiments of the invention, the properties of a rectangle may include object, layer, center x, center y, angle, width, height, and comer radius.

Spline Tool

Figure 9:
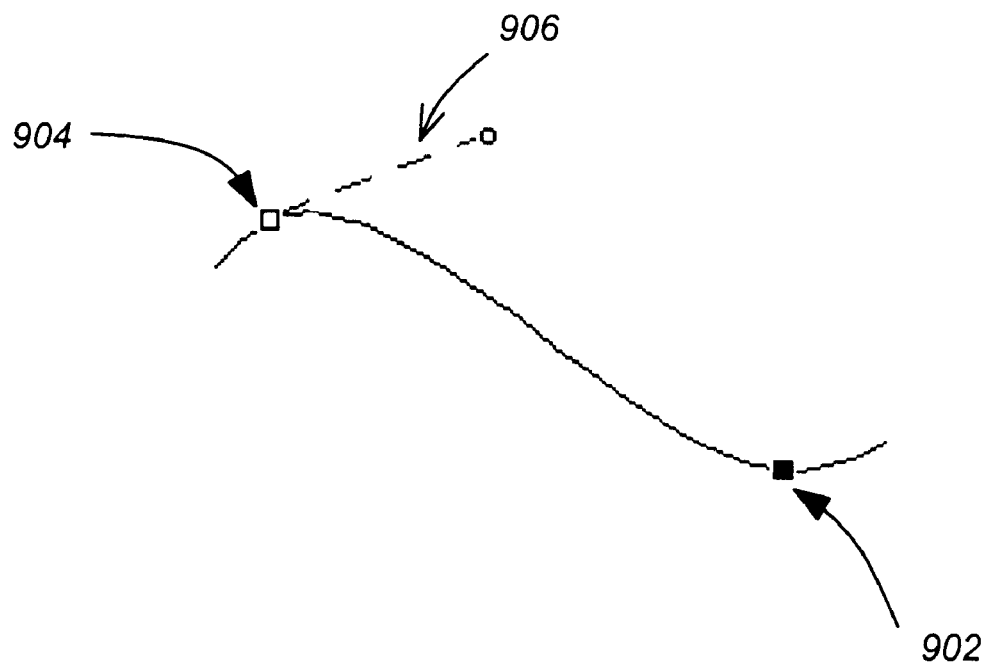
FIG. 9 illustrates a spline drawn using a spline tool of the invention.

FIG. 9 illustrates a spline drawn using a spline tool of the invention. A spline is defined by two or more points 902 and 904. The spline curve will pass smoothly through the points 902 and 904. The direction of the curve as it passes through each point 902 and 904 is determined by the tangent angle at that point (which a user can adjust using a tangent handle 904 and the tangent line 906). The curvature of the spline at each point is determined by the tangent magnitude. To draw a spline, the user clicks the starting point 902 for the spline, and then clicks each additional point 904 in the spline curve. To end the spline curve, the user may double click or right click to end the tool. When a spline is first selected, only the point handles 902 and 904 will be shown. The user may click on a point handle 902 or 904 to highlight it and show its tangent handle (and tangent line 906). In accordance with one or more embodiments of the invention, the properties of a spline may include object, layer, point0 x point0 y, tangent x, tangent y, lock tangent, point1 x, point1 y, tangent x, tangent y, lock tangent, etc.

Text Tool

The text tool allows the user to type text on a drawing. The user clicks and drags from one corner of the text to the other, similar to drawing a rectangle. Again, holding <SHIFT>while dragging will constrain the text area to a square. The user then types the text into the "Enter text" dialog and clicks OK. The text is entered into the text box such that it fits in the best possible way. In other words, the text is not allowed to cross over the right-hand edge of the text box, but may extend below the bottom most edge of the box if required. Text height and font are controlled by a text height tool.

Polyline and Sketch Tool

Figure 10A:
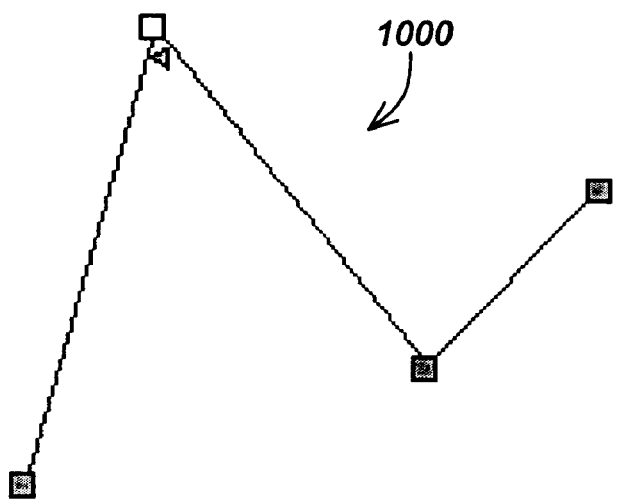
FIGS. 10A and 10B illustrates a polylie and sketch drawn using a polyline tool and sketch tool of the invention.
Figure 10B:
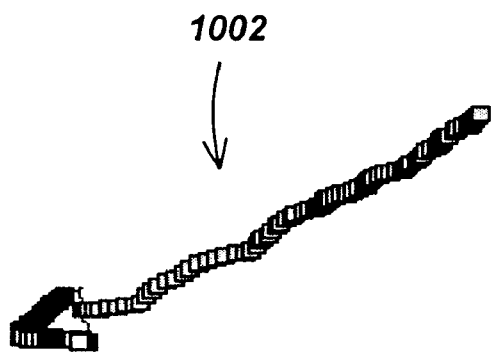

Similar to the cloud tool, the polyline and sketch tools create a Path object. FIGS. 10A and 10B illustrates a polyline 1000 and sketch 1002 drawn using a polyline tool and sketch tool of the invention. Polyline and sketch tools create an open object and append a new segment with each mouse movement or click The polyline tool is a creation tool for a path consisting of all straight line segments. Further, similar to the cloud tool, the path options, join command, explode command, add command, and split command can all be used with the polyline and sketch tools. Both the polylines and sketches may have the same properties as a cloud as described above.

The sketch tool allows the user to draw freehand. When the sketch tool is selected and the left mouse button is down, dragging the cursor around the screen causes a freehand line 1002 to be created along the path of the mouse travel. If <SHIFT>is held while dragging, the lines are constrained to the eight ordinal dimensions until <SHIFT>is released.

Note Tool

The note tool, when active, places a note on the markup overlay. In accordance with one or more embodiments of the invention, the note is an active shape (also referred to as an intelligent shape) that behaves similar to the note object in the graphics program Actrix® 1.0.

Intelligent shapes are more fully described in U.S. patent application Ser. No. 09/488,308 entitled "SHAPE OBJECTS HAVING AUTHORABLE BEHAVIORS AND APPEARANCES", by Lawrence Felser, et. al., filed on Jan. 20, 2000; U.S. patent application Ser. No. 09/088,116, entitled "POSITIONING AND ALIGNMENT AIDS FOR SHAPE OBJECTS WITH AUTHORABLE BEHAVIORS AND APPEARANCES", by Lawrence Felser, et. al., filed on Jun. 1, 1998; and U.S. patent application Ser. No. 09/450,207, entitled "FRAMEWORK FOR OBJECTS HAVING AUTHORABLE BEHAVIORS AND APPEARANCES", by Lawrence Felser, et. al., filed on Nov. 29, 1999, all of which are hereby fully incorporated by reference.

Figure 11:
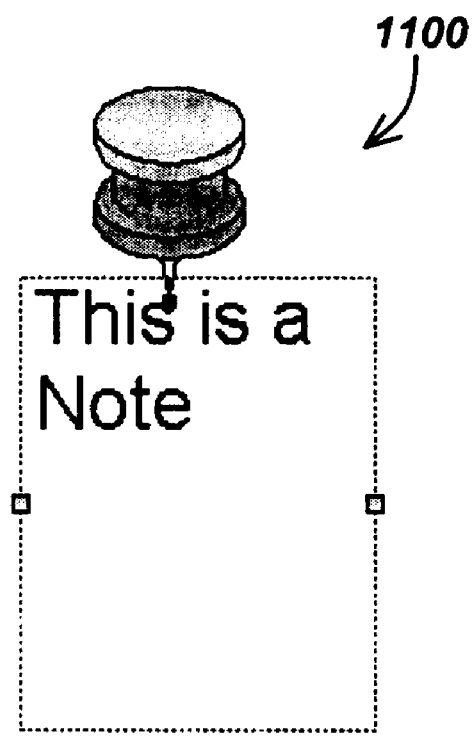
FIG. 11 illustrates a note drawn using a note tool of the invention.

Notes are regions of the drawing that contain associated information. Notes are similar to text boxes except that the text is not visible on the screen until the user puts the mouse over the region of the note. At this point, the note appears as a tooltip. FIG. 11 illustrates a note 1100 drawn using a note tool of the invention.

Notes are defined by rectangular regions that are drawn in the same manner as the rectangle markup objects described above. Note regions are transparently shaded in a color of the user's choosing in order to make them more visible. When the cursor moves over a region of the drawing that contains a note, the cursor changes to a different icon to illustrate that a note is present (similar to the way the cursor behaves when it moves over a hyperlink region on a browser). If the user hovers over the note for a brief period of time, the full text of the note appears in a tooltip that is placed above the upper left corner of the note region after an author's name.

Right-clicking over a note region presents a context menu that contains the items "Edit Note" and "Delete Note," which are used to delete or edit the note if the user is the author of the note. If the user is not the author of the note, right-clicking will present a context menu that contains "Append Note" which will allow that user to append his own comments to the note.

Callout Tool

Figure 12:
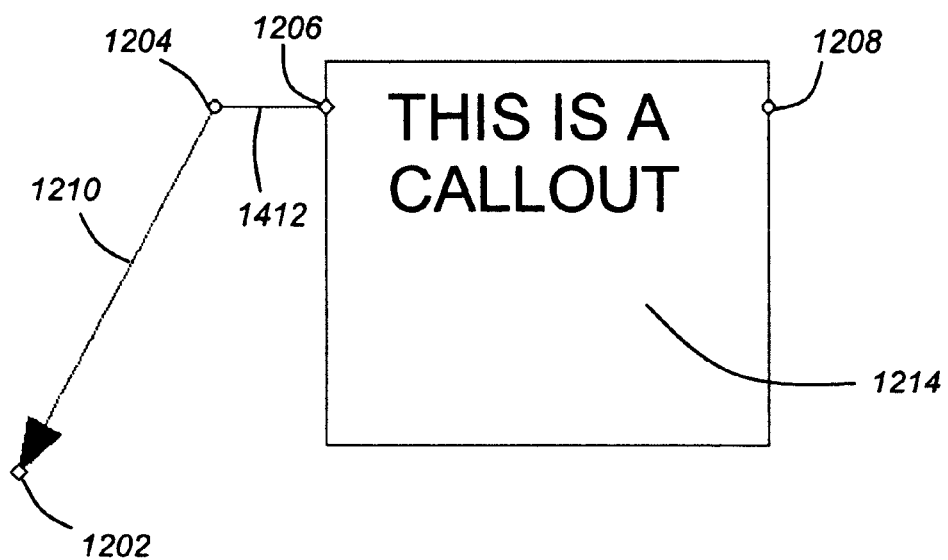
FIG. 12 illustrates a callout drawn using a callout tool of the invention.

FIG. 12 illustrates a callout drawn using a callout tool of the invention. A callout consists of an arrowhead 1202, two line segments 1210 and 1212, and a text object 1214. The callout tool places a bent callout on the markup overlay, with one click. The user creates a callout by clicking on a point where the callout should be anchored (e.g., point 1202). The user can then adjust the callout using the various handles 1202, 1204, 1206, and 1208. For example, to move the pivot and adjust line segments 1210 and 1212, the user can select and move point 1204. To move the text box, the user selects and moves point 1206 (such moving may affect bend angles to avoid interference). To resize the text box 1214, the user selects and moves point 1208. Further, in accordance with one or more embodiments of the invention, users can change the scale factor of callout arrowheads 1202.

In an alternate embodiment, the user may click each point 1202, 1204, 1206, and 1208 sequentially to create the callout including arrowhead 1202, segments 1210 and 1212, and text box 1214.

Stamp Tool

Stamps can be created from the user's DWG files. Additionally, stamps may be provided with a software package provided in accordance with one or more embodiments of the invention. Stamps are essentially active shapes (as provided in the Actrix® 1.0 product) with very little intelligence. A converter tool may allow a user to add stamps to a currently selected palette or to a new palette. The stamp tool requests a DWG file (or multiple DWG files) from which it will extract any blocks contained in the file and create active shapes from them. If a given DWG file is used with the tool and does not contain any block definitions, the entire DWG file will be used as the stamp image.

Link Tool

A link is similar to a note except that it changes the cursor to a pointing hand and allows the user to execute a file when the mouse is clicked. When a user moves the cursor over a link area, the pointing hand appears and a tooltip appears with the link location. When the mouse is clicked, embodiments of the invention send the file to the operating system where it is executed.

In accordance with one or more embodiments of the invention, users can edit certain aspects of the markup objects. Certain editing options of markup objects are supported by all markup objects. Other options are only supported by some objects. When a markup object is selected (e.g., by clicking on the geometry or fill of an object), its handles are displayed allowing it to be modified or moved easily.

An edit menu provides tools for undo, redo, cut, copy, past, paste special, delete, and select all. These tools behave according to standard editing features currently available. For example, users can delete the markup object's selection set by choosing or pressing <DEL>or clicking the delete button/icon.

CONCLUSION

This concludes the description of one or more embodiments of the invention. The following describes some alternative embodiments for accomplishing the present invention.

For example, any type of computer, such as a mainframe, minicomputer, work station or personal computer, could be used with the present invention. In addition, any program, function, or operating system providing graphical functions could benefit from the present invention.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but-rather by the claims appended hereto.

What is claimed is:

1. A computer-implemented apparatus for viewing graphical images comprising an integrated viewing tool, performed by a computer, for displaying, annotating, and redlining graphical images from a drawing file stored on the computer and wherein the integrated viewing tool comprises a mechanism for drawing a closed shape around a region of the graphical images, wherein the closed shape is comprised of multiple arc segments, and wherein the multiple arc segments have bulge spacing defined by a bulge spacing function, and are drawn automatically from conjoining endpoints of the multiple arc segments using cursor location input.

2. The apparatus of claim 1 wherein the bulge spacing function comprises setting the bulge spacing for the multiple arc segments equal to the bulge spacing of a first arc segment when:

a first point of the first arc segment has been selected;

an arc defining key has been depressed and held down; and a second point of the first arc segment is selected.

3. A method for drawing an enclosed shape with at least two arc segments comprising:

obtaining input for a first point of a first arc segment of the shape;

determining if an arc defining key has been depressed and held down;

obtaining input for a second point of the first arc segment wherein the distance between the first point and the second point defines bulge spacing when it has been determined that the arc defining key was depressed and held down;.

displaying the first arc segment between the first point and the, second point;

obtaining cursor location input from a mouse device; and displaying a second arc segment that begins at the second point of the first arc segment and has the defined bulge spacing and wherein the end point of the second arc segment is automatically determined and corresponds with the cursor location input obtained from the mouse device.

4. The method of claim 3 wherein the arc defining key is the SHIFT key.

5. The method of claim 3 further comprising displaying one or more additional arc segments with the defined bulge spacing by:

obtaining additional cursor location inputs from the mouse device; and displaying the one or more additional arc segments at the endpoint of any previous arc segment and wherein the endpoints of the one or more additional arc segments are automatically determined and correspond with the cursor location inputs obtained from the mouse device.

6. The method of claim 3 further comprising automatically completing the enclosed shape by joining the first arc segment and the last arc segment at conjoining endpoints when the cursor location input is near the first point of the first arc segment.

7. The method of claim 3 further comprising displaying additional arc segments wherein the additional arc segments do not have the defined bulge spacing.

8. The method of claim 3 wherein the enclosed shape is a path object.

9. The method of claim 3 wherein the enclosed shape surrounds an existing odd shaped graphical image.

10. The method of claim 3 wherein the enclosed shape is a markup object of an associated drawing, the method further comprising storing the enclosed shape in a separate file from the associated drawing.

11. A computer-implemented graphics system for drawing an enclosed shape with at least two arc segments comprising:

a computer having a monitor attached thereto;

means, performed by the computer, for obtaining input for a first point of a first arc segment of the enclosed shape;

means, performed by the computer, for determining if an arc defining key has been depressed and held down;

means, performed by the computer, for obtaining input for a second point of the first arc segment wherein the distance between the first point and the second point defines bulge spacing when it has been determined that the arc defining key was depressed and held down;

means, performed by the computer, for displaying the first arc segment between the first point and the second point;

means, performed by the computer, for obtaining cursor location input from a mouse device; and means, performed by the computer, for displaying a second arc segment that begins at the second point of the first arc segment and has the defined bulge spacing and wherein the end point of the second arc segment is automatically determined and corresponds with the cursor location input obtained from the mouse device.

12. The system of claim 11 wherein the arc defining key is the SHIFT key.

13. The system of claim 11 further comprising means, performed by the computer, for displaying one or more additional arc segments with the defined bulge spacing, the means comprising:

means, performed by the computer, for obtaining additional cursor location inputs from the mouse device; and means, performed by the computer, for displaying the one or more additional arc segments at the endpoint of any previous arc segment and wherein the endpoints of the one or more additional arc segments are automatically determined and correspond with the cursor location inputs obtained from the mouse device.

14. The system of claim 11 further comprising means, performed by the computer, for automatically completing the enclosed shape by joining the first arc segment and the last arc segment at conjoining endpoints when the cursor location input is near the first point of the first arc segment.

15. The system of claim 11 further comprising means, performed by the computer, for displaying additional arc segments wherein the additional arc segments do not have the defined bulge spacing.

16. The system of claim 11 wherein the enclosed shape is a path object.

17. The system of claim 11 wherein the enclosed shape surrounds an existing odd shaped graphical image.

18. The system of claim 11 wherein the enclosed shape is a markup object of an associated drawing, the system further comprising means, performed by the computer, for storing the enclosed shape in a separate file from the associated drawing.

19. An article of manufacture embodying logic for performing a method for drawing an enclosed shape with at least two arc segments, the method comprising:

obtaining input for a first point of a first arc segment of the enclosed shape;

determining if an arc defining key has been depressed and held down;

obtaining input for a second point of the first arc segment wherein the distance between the first point and the second point defines bulge spacing when it has been determined that the arc defining key was depressed and held down;

displaying the first arc segment between the first point and the second point;

obtaining cursor location input from a mouse device; and displaying a second arc segment that begins at the second point of the first arc segment and has the defined bulge spacing and wherein the end point of the second arc segment is automatically determined and corresponds with the cursor location input obtained from the mouse device.

20. The article of manufacture of claim 19 wherein the arc defining key is the SHIFT key.

21. The article of manufacture of claim 19 wherein the method further comprises displaying one or more additional arc segments with the defined bulge spacing by:

obtaining additional cursor location inputs from the mouse device; and displaying the one or more additional arc segments at the endpoint of any previous arc segment and wherein the endpoints of the one or more additional arc segments are automatically determined and correspond with the cursor location inputs obtained from the mouse device.

22. The article of manufacture of claim 19 wherein the method further comprises automatically completing the enclosed shape by joining the first arc segment and the last arc segment at conjoining endpoints when the cursor location input is near the first point of the first arc segment.

23. The article of manufacture of claim 19 wherein the method further comprises displaying additional arc segments wherein the additional arc segments do not have the defined bulge spacing.

24. The article of manufacture of claim 19 wherein the enclosed shape is a path object.

25. The article of manufacture of claim 19 wherein the enclosed shape surrounds an existing odd shaped graphical image.

26. The article of manufacture of claim 19 wherein the enclosed shape is a markup object of an associated drawing, the method further comprising storing the enclosed shape in a separate file from the associated drawing.

* * * * *